United States Patent [19]

Fischer et al.

[11] Patent Number: 4,934,412
[45] Date of Patent: Jun. 19, 1990

[54] COOLING PIPE LINE FOR AN ENGINE

[75] Inventors: Josef Fischer, Ried im Innkreis; Walter A. Stephan, Braunau, both of Austria

[73] Assignee: Fischer Advanced Composite Components Gesellschaft M.B.H., Reid im Innkreis, Austria

[21] Appl. No.: 168,222

[22] Filed: Mar. 10, 1988

[30] Foreign Application Priority Data

Mar. 10, 1987 [AT] Austria ................................ 562/87
Feb. 19, 1988 [AT] Austria ................................ 397/88

[51] Int. Cl.$^5$ .............................................. F16L 9/14
[52] U.S. Cl. ..................... 138/149; 138/138; 138/140; 138/143; 138/DIG. 2; 138/DIG. 10
[58] Field of Search ............... 138/137, 138, 140, 141, 138/143, 149, DIG. 2, DIG. 10

[56] References Cited

U.S. PATENT DOCUMENTS

| 3,044,499 | 7/1962 | Frerich | 138/149 |
|---|---|---|---|
| 3,053,715 | 9/1962 | Labino | 138/149 |
| 3,554,237 | 1/1971 | Pelley et al. | 138/149 |
| 3,614,967 | 10/1971 | Royston | 138/149 |
| 3,886,024 | 5/1975 | Chase | 138/141 |
| 3,901,281 | 8/1975 | Morrisey | 138/140 |
| 3,963,547 | 6/1976 | Kaneko et al. | 138/149 |
| 4,208,373 | 6/1980 | Matovich | 138/149 |
| 4,310,585 | 1/1982 | Shannon | 138/149 |
| 4,442,585 | 4/1984 | McGehee et al. | 138/149 |
| 4,516,608 | 5/1985 | Titus et al. | 138/149 |
| 4,673,002 | 6/1987 | Scanlon et al. | 138/149 |

FOREIGN PATENT DOCUMENTS 2625107 6/1976 Fed. Rep. of Germany .
623908 6/1981 Switzerland .

Primary Examiner—James E. Bryant, III
Attorney, Agent, or Firm—Fleit, Jacobson, Cohn, Price, Holman & Stern

[57] ABSTRACT

In a pipe line for an engine, in particular a cooling line in aircraft construction, the walls of the pipe line are composed of a load-bearing inner layer (2) of fibre reinforced, curable synthetic resin and of a heat insulating outer layer (3) of fibre reinforced curable synthetic resin, bonded to the inner layer (2). For the production of the two layers (2, 3) a removable core (1) is used, for example composed of a low melting metal alloy.

2 Claims, 1 Drawing Sheet

COOLING PIPE LINE FOR AN ENGINE

BACKGROUND AND FIELD OF THE INVENTION

The invention relates to a pipe line for an engine, in particular a cooling line for aircraft construction as well as a process for the manufacture of such pipe line.

The pipe line is fitted in the front region of the engine. Air under dynamic pressure is passed to the engine through the open end of the pipe line in order to cool the gears of the engine. Known pipe lines of this type are manfactured of high strength steels or titanium. Due to the dynamic loads resulting from the engine, the life expectancy of this component is limited.

Synthetic resins reinforced with high strength fibres and organic matrix materials such as epoxy or phenolic resins are used to an increasing extent because of their favourable mechanical properties and low mass as a replacement for light metal material such as aluminium or titanium, particularly in the aircraft industry. The range of usefulness of such synthetic resins in general has its maximum at about 180° C. In the context of space travel and military aviation a special polyimide resin was developed which resists exposure to temperatures up to 400° C. However, because of technological problems this synthetic resin cannot yet keep pace with the growth of the employment of fibre composite materials in the aircraft industry.

In the event of an engine catching fire, the pipe line of the gear mechanism of the engine must continue to supply cooling for a predetermined duration and must resist a predetermined internal pressure as laid down by the manufacturer of the engine.

To date such pipe lines have been manufactured of high temperature resistant steel. The operating temperature of the pipe line when starting the engine, amounts to 180° to 280° C. and reaches 370° C. during long-term operation. In special situations such as fire, the temperature amounts to about 1100° C. The pipe line must withstand this temperature for 15 minutes without burning through or leaking, whilst the mechanical strength as well must be preserved.

From DE-OS 26 25 107 a dual layer composite pipe of plastics is known, the inner layer of which is produced from a chemically and temperature resistant synthetic resin with a powderous and/or fibrous filler and the outer layer of which is produced of a reinforcing glass fibre reinforced synthetic resin, both layers being cured simultaneously under pressure and at elevated temperature.

CH-PS 623 908 describes a plastics pipe having an inner and an outer layer, each being glass fibre reinforced, the glass fibres in the inner layer being orientated circumferentially and in the outer layer axially in order to provide a high pressure resistance when used as a pipe for a natural gas pipe line. After the inner layer has been wound and cured on a pin, the pin is removed and replaced by a different one which generates an axial pressure. During the application and curing of the outer layer the inner layer is preferablly simultaneously subjected to the action of a pressure medium. In this case as well, it is apparent that the pin is only withdrawn after the outer layer has been cured to completion. The final curing takes place solely by increased temperature (infrared lamps).

GENERAL DESCRIPTION OF THE INVENTION

It is an object of the invention to provide a pipeline for cooling engines which is lighter compared to known pipe lines of this type and has a smooth inner surface, having a relatively long life expectancy when subjected to dynamic loads and will comply with the specifications laid down by the engine manufacturers in respect of thermal and flame resistance as well as gas tightness.

Further or alternative objects will become apparent from what follows.

In accordance with the invention a pipe line or pipe line component is provided as set out in the opening paragraph, wherein the walls of the pipe line are composed in a manner known per se of an inner and an outer layer of fibre reinforced cured synthetic resin, the inner layer, reinforced with carbon fibres being load-bearing and the outer layer, reinforced with ceramic fibres being designed for thermal insulation.

Advantageously a gastight high temperature resistant foil is provided between the inner layer and the outer layer. The foil can be of metal, especially steel, plastic, compound material, or silicone rubber.

A first process for the manufacture of a pipe component comprises, in accordance with the invention, that the inner layer in a manner known per se is applied onto a subsequently removable core, the outer contours of which correspond to the desired inner contours of the pipe line, whereafter the outer layer is applied over the inner layer and a vacuum foil in the form of a bag is drawn over the outer layer and the ends of the core and is evacuated and sealed whereafter a precuring of the inner and outer layers takes place at elevated temperature and pressure, whereupon the vacuum foil and the core are removed and a further curing takes place at the same pressure but at a higher temperature than that of the preliminary curing. In the event of a gastight high temperature resistant foil being employed, the latter is applied prior to the application of the outer layer onto the inner layer.

A second process for the manufacture of the pipe component comprises, according to the invention, that the inner layer in a manner known per se is applied onto a subsequently removable core, the outer contours of which correspond to the inner contours of the pipe line, whereafter a vacuum foil in the form of a bag is drawn over the inner layer and the core ends, is evacuated and sealed, and thereafter a preliminary curing of the inner layer takes place at elevated temperature and pressure, whereafter the vacuum foil and the core are removed, the outer layer is applied and a vacuum foil in the form of a bag is drawn over the outer layer and is evacuated and sealed and a subsequent curing of the inner and outer layers takes place at the same pressure but at a higher temperature than that during the preliminary curing. In the event of a gastight high temperature resistant foil being employed, this is applied after the preliminary curing of the inner layer, whereafter the outer layer is applied.

BRIEF DESCRIPTION OF THE DRAWINGS

Further features and details of the invention will be explained in what follows with reference to the drawing. There is shown in FIG. 1 a cross section of a first embodiment of a pipe line according to the invention, in FIG. 2 a cross section of a second embodiment of a pipe line according to the invention and in FIG. 3 a diagram for elucidating a process according to the invention for manufacturing the pipe line.

DESCRIPTION OF SPECIFIC EMBODIMENTS

Figure 1:
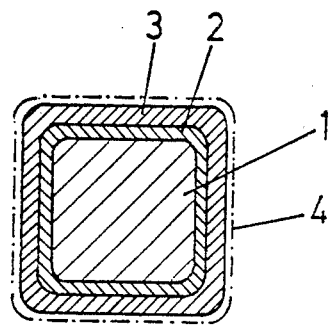
Figure 3:
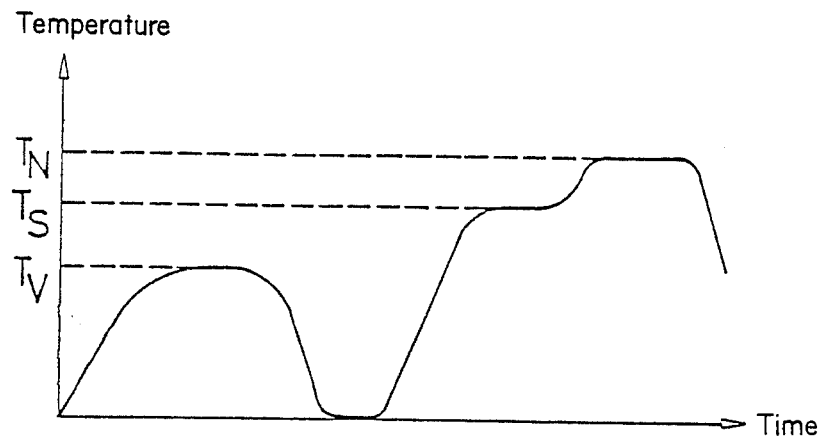

In the example according to FIG. 1 a core is denoted as 1, produced of a low melting metal alloy in conformance with the desired inner contours of the pipe line, e.g. by casting in a mould. Wood's metal or soldering tin is preferably employed as the metal alloy, having a melting temperature of 190° to 210° C. The cross sectional configuration of the core may be square, oval, circular etc. as required. Instead of a metal alloy it is also possible to employ plaster of Paris or a salt, the plaster of Paris being removable mechanically and the salt being removable by melting or washing. Successively an inner layer 2 and an outer layer 3 are applied onto the core 1. The inner layer 2 is composed of a carbon fibre-reinforced synthetic resin and the outer layer 3 of a plastics reinforced with ceramic fibres. Preferably a polyimide resin is used to serve as the synthetic resin for the inner and outer layers 2, 3. A vacuum foil 4 in the form of a bag is drawn over the outer layer 3 at the core ends and is evacuated and sealed to form a compact unit. This unit is introduced into an autoclave in which the two layers 2, 3 are preliminarily cured at a temperature $T_V$ (FIG. 3) of 168° to 186° C., preferably 177° C. and a pressure of 4 to 10 bar, preferably 5 bar. After the preliminary curing the unit is removed from the autoclave and the vacuum foil is removed. In the event that the core 1 is composed of plaster of Paris or a salt, it is removed in the manner described above. In the event that the core 1 is composed of a metal alloy, the unit from which the vacuum foil 4 has been removed is reintroduced into the autoclave and the temperature is raised at least to the melting temperature $T_2$ (FIG. 3) and is maintained for such time until the core 1 has flown completely out of the inner layer 2. After subsequent solidification the metal alloy can be reduced in an advantageous manner for the production of a new core. The temperature is subsequently increased further to a temperature $T_N$ (FIG. 3) of 285° to 315° C., preferably 300° C., in order to bring about a further curing of the two layers 2, 3, the pressure being once again kept at 4 to 10 bar, preferably 5 bar. After a specific curing period, the pipe line which is now complete is removed from the autoclave and optionally subjected to an external surface posttreatment. It is also possible for the melting out of the core 1 after the preliminary cure to take place in an oven or the like instead of an autoclave. In accordance with a further process according to the invention, only the inner layer 2 is initially applied onto the core 1, covered with a vacuum foil 4 and preliminarily cured, whereafter the core 1 and the vacuum coil 4 are removed, the outer layer 3 is applied, covered with a vacuum foil 4 and thereafter subjected to subsequent curing.

Figure 2:
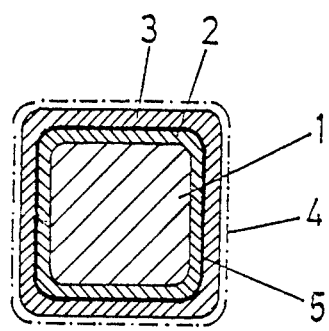

In the example according to FIG. 2 a metal foil 5, preferably a steel foil is provided between the inner layer 2 and the outer layer 3. In the first mentioned process the metal foil 4 is applied prior to the application of the outer layer 3 onto the inner layer 2. In the second mentioned process the metal foil 5 is applied after the preliminary curing of the inner layer 2, whereafter the outer layer is applied.

Due to the combination of the outer and inner layers 3, 2 with the metal foil 5 the result is attained that in the event of flame effects at a temperature higher than the melting point of the metal foil, the latter cannot melt off, because due to the burning off of the inner and outer layers 2, 3 a gas insulating layer is formed which serves as an insulation against thermal effects onto the metal foil 5 which latter acts as a gas barrier.

Due to the presence of the metal foil 5, the thickness of the outer layer 3 can be reduced as compared with that according to the example of FIG. 1. In spite of the additional metal foil 5 the mass of the tube component is only about ¼ of the mass of the tube component manufactured of steel.

The claims which follow are to be considered an integral part of the present disclosure. Reference numbers (directed to the drawings) shown in the claims serve to facilitate the correlation of integers of the claims, with illustrated features of certain preferred embodiments but are not intended to restrict in any way the language of the claims to what is shown in the drawings, unless the contrary is clearly apparent from the context.

What we claim is:

1. A cooling pipe line for an aircraft engine, said pipe line comprising:
    a load-bearing inner layer made of carbon fibre reinforced cured polyimide resin,
    a thermal insulating outer layer made of ceramic fibre reinforced cured polyimide resin, and
    a gas-tight high temperature resistant foil located between said inner layer and said outer layer.
2. A cooling pipe line for an aircraft engine in accordance with claim 1, wherein said foil is made of steel.

* * * * *

UNITED STATES PATENT AND TRADEMARK OFFICE
CERTIFICATE OF CORRECTION

PATENT NO. : 4,934,412

DATED : June 19, 1990

INVENTOR(S) : Josef Fischer et al.

It is certified that error appears in the above-identified patent and that said Letters Patent is hereby corrected as shown below:

On the title page:
Section [73], in the address of the Assignee, delete "Reid" and insert therefor -- Ried --.

Signed and Sealed this

Sixth Day of April, 1993

Attest:

STEPHEN G. KUNIN

*Attesting Officer*  *Acting Commissioner of Patents and Trademarks*